US010540323B2

(12) United States Patent
Blagojevic et al.

(10) Patent No.: US 10,540,323 B2
(45) Date of Patent: Jan. 21, 2020

(54) MANAGING I/O OPERATIONS IN A STORAGE NETWORK

(71) Applicant: Western Digital Technologies, Inc., San Jose, CA (US)

(72) Inventors: Filip Blagojevic, Emeryville, CA (US); Cyril Guyot, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 8 days.

(21) Appl. No.: 15/608,945

(22) Filed: May 30, 2017

(65) Prior Publication Data
US 2018/0349396 A1     Dec. 6, 2018

(51) Int. Cl.
*G06F 16/13* (2019.01)
*G06F 16/182* (2019.01)
*G06F 3/06* (2006.01)
*H04N 21/231* (2011.01)
*G06F 15/173* (2006.01)
*H04L 29/08* (2006.01)

(52) U.S. Cl.
CPC .......... *G06F 16/137* (2019.01); *G06F 3/0659* (2013.01); *G06F 16/183* (2019.01); *H04N 21/23103* (2013.01); *G06F 3/0604* (2013.01); *G06F 15/17331* (2013.01)

(58) Field of Classification Search
CPC ................. G06F 3/061; G06F 12/1018; G06F 17/30595; G06F 17/3086; G06F 16/137; G06F 15/17331; G06F 17/30097; H04N 21/23103
See application file for complete search history.

(56) References Cited

U.S. PATENT DOCUMENTS

| 6,999,967 | B1 * | 2/2006 | Ghazal | ................ G06F 16/2456 |
| 7,600,075 | B2 | 10/2009 | Cousins | |
| 7,778,984 | B2 | 8/2010 | Zhang et al. | |

(Continued)

FOREIGN PATENT DOCUMENTS

CN     104123359     10/2014

OTHER PUBLICATIONS

Osterhout et al. "The Case for RAMClouds: Scalable High-Performance Storage Entirely in DRAM" dated 2010, 14 pages.

(Continued)

*Primary Examiner* — Getente A Yimer
(74) *Attorney, Agent, or Firm* — Patent Law Works LLP

(57) ABSTRACT

Various aspects for managing input/output operations in a storage network are described. For instance, a method may include applying a hash function on a target data object to calculate a hash key for the target data object and identifying a target storage bucket for the target data object based on the hash key and a hash table map. The method may further include reading a data object key for a data object stored in the target storage bucket and comparing the data object key and the hash key to determine a match. The method may also include determining that the data object is the target data object if the data object key and the hash key match and reading the target data object from the target storage bucket when there is a match. Some methods can be performed using a single remote direct access request.

20 Claims, 13 Drawing Sheets

(56) References Cited

U.S. PATENT DOCUMENTS

| | | | |
|---|---|---|---|
| 8,014,278 B1* | 9/2011 | Subramanian | H04L 12/2867 370/229 |
| 8,112,452 B2 | 2/2012 | Adya et al. | |
| 8,161,353 B2 | 4/2012 | Flynn et al. | |
| 8,290,919 B1 | 10/2012 | Kelly et al. | |
| 8,675,672 B1* | 3/2014 | Bao | H04L 45/46 370/408 |
| 8,938,469 B1 | 1/2015 | Keen et al. | |
| 9,075,710 B2 | 7/2015 | Talagala et al. | |
| 9,686,283 B2* | 6/2017 | Hunt | H04L 63/1483 |
| 2002/0032691 A1 | 3/2002 | Rabii et al. | |
| 2002/0133491 A1 | 9/2002 | Sim et al. | |
| 2004/0030770 A1* | 2/2004 | Pandya | H04L 29/06 709/223 |
| 2004/0111608 A1 | 6/2004 | Oom Temudo de Castro et al. | |
| 2012/0124282 A1* | 5/2012 | Frank | G06F 3/061 711/108 |
| 2012/0179723 A1 | 7/2012 | Lin et al. | |
| 2013/0227195 A1 | 8/2013 | Beaverson et al. | |
| 2014/0143364 A1 | 5/2014 | Guerin et al. | |
| 2015/0379009 A1 | 12/2015 | Reddy et al. | |
| 2016/0026672 A1 | 1/2016 | Zhang et al. | |
| 2016/0048332 A1* | 2/2016 | Kimmel | G06F 3/0611 711/103 |
| 2016/0179802 A1* | 6/2016 | Olshanetckii | G06F 16/245 707/747 |
| 2017/0147598 A1* | 5/2017 | Sawada | G06F 12/00 |

OTHER PUBLICATIONS

Dragojevic et al. "FaRM: Fast Remote Memory" dated Apr. 2-4, 2014, 15 pages, USENIX.

Rowstron et al. "Pastry: Scalable, Decentralized Object Location, and Routing for Large-Scale Peer-to-Peer Systems" dated Oct. 31, 2001, 5 pages, Springer Link.

MacCormick et al. "Kinesis: A New Approach to Replica Placement in Distributed Storage Systems" dated Jan. 2009, 28 pages, ACM Transactions on Storage, vol. 4, No. 4, Article 11.

SAGE "The RADOS Distributed Object Store" dated May 19, 2009, 3 pages, Red Hat, Inc.

Geambasu et al. "Comet: An Active Distributed Key-Value Store" dated 2010, 14 pages, University of Washington.

Robert Primmer "Distributed Object Store Principles of Operation: The Case for Intelligent Storage" dated Jul. 2010, 20 pages, Hitachi Inspire the Next.

Kalia et al. "Using RDMA Efficiently for Key-Value Services", dated Aug. 17-22, 2014, 15 pages, SIGCOMM'14.

Author Unknown "Ceph: A Distributed Object Storage System", dated Sep. 23, 2015, 9 pages, Spark Support Infotech Pvt Ltd.

Author Unknown "Storing Variable Length Keys in Hash Table Itself" dated Sep. 23, 2015, 1 page.

Zhao et al. "GreenCHT: A Power-Proportional Replication Scheme for Consistent Hashing Based Key Value Storage Systems" dated 2015, 6 pages, IEEE.

Kejriwal et al. "SLIK: Scalable Low-Latency Indexes for a Key-Value Store" dated Jun. 22-24, 2016, 12 pages, 2016 USENIX Annual Technical Conference.

Richardliao "Swarmstorage is an Open Source CADOS (Content Addressable Distributed Object Storage" dated Aug. 5, 2016, 4 pages, GitHub, Inc.

Johan Montelius "Distributed Systems ID2201" found at <https://www.kth.se/polopoly_fs/1.1213317!/Menu/general/column-content/attachment/130-peer-to-peer.pdf , printed on Aug. 12, 2016, 21 pages.

International Application No. PCT/US2018/020803 Search Report and Written Opinion, dated May 15, 2018, pp. 1-14.

* cited by examiner

MANAGING I/O OPERATIONS IN A STORAGE NETWORK

BACKGROUND

Field of the Technology

The present disclosure relates to computing networks and, more particularly, to managing input/output operations in a storage network or system.

Description of Related Art

Various computing networks and systems are capable of storing data. A subset of these computing networks and systems are configured to store data as data objects. Some of these data objects are capable of containing large amounts of data (e.g., at least two terabytes (2 TB) of data, although other amounts are applicable that experience throughput and storage-related issues).

Typically, when a computing system receives an input/output (I/O) request to write a data object to long-term storage, the data object is initially written to a storage buffer of a cache. The data object in the storage buffer is subsequently written to long-term storage and may be accessed in the future via read requests and/or read-write requests.

Some storage networks and/or systems may enable a computing device or node that is requesting storage of the data object to select the storage location where the data object is to be stored. The selected storage location where the data object is to be stored is recorded in a hash table and the data object may then be stored in one or more storage devices corresponding to the selected storage location. A hash table may provide a map of the various storage locations in the storage device(s) that can assist in directing I/O operations to the location of the data object(s) stored therein.

In some instances, the storage location selected by the computing device/node may be unavailable at the time the request to store the data object is received and the data object may ultimately be stored to an alternative storage location. Further, the selected storage location for the data object may have been recorded in the hash table prior to determining that the selected storage location is unavailable and storing the data object to the alternative location. For instance, the data object may be stored in a different storage location than the storage location mapped in the hash table, which can cause issues when attempting to locate the data object for future I/O operations.

While some previous storage networks and systems are generally capable of storing data objects, they are often unable to do so reliably and/or efficiently, particularly at high volumes and/or when processing large data objects. This can cause data loss and/or performance issues that impact business operations and incur significant unneeded costs. For instance, some storage systems may fail (e.g. crash, etc.) and/or underperform (e.g., have latency issues, etc.) in situations in which one or more I/O requests are directed to a data object that is not properly mapped in a hash table.

SUMMARY

The present disclosure describes various aspects for reliably and efficiently managing input/output (I/O) operations in various computer systems, such as storage networks and/or storage systems.

In general, one innovative aspect of the subject matter described in this disclosure may be embodied in a storage network, comprising: a first node coupleable to a second node, the second node including a set of non-volatile memory devices comprising a set of storage segments divided into a plurality of storage buckets to store data objects. The first node includes a controller executable to perform operations comprising: applying a first hash function on a first target data object to calculate a first hash key for the first target data object; identifying a first target storage bucket for the first target data object in the second node based on the first hash key and a first map of a hash table; reading a first data object key for a first data object stored in the first target storage bucket; comparing the first data object key and the first hash key to determine a match; responsive to the first data object key and the first hash key matching, determining that the first data object is the first target data object; responsive to the determination that the first data object is the first target data object, reading the first target data object from the first target storage bucket.

These and other implementations may each optionally include one or more of the following features: that the storage network that the controller performs the operations in association with a single remote direct memory access operation; the operations further include applying a second hash function on a second target data object to calculate a second hash key for the second target data object; the operations further include identifying a second target storage bucket for the second target data object in the second node based on the second hash key and the first map; the operations further include reading a second data object key for a second data object stored in the second target storage bucket; the operations further include comparing the second data object key and the second hash key to determine a match; the operations further include, responsive to the second data object key and the second hash key not matching, the operations further include determining that the second data object and the second target data object are different data objects; the operations further include, responsive to a determination that the second data object and the second target data object are different data objects, reading first metadata to identify a first alternate storage bucket in a first set of storage buckets storing the second target data object, a first storage segment comprising the first metadata and the first set of storage buckets, and the first set of storage buckets comprising the second target storage bucket; that the first metadata provides a second map of a first set of metadata keys based on first data object keys for first data objects stored in the first set of storage buckets; and reading the first metadata further includes reading the first set of metadata keys, comparing the first set of metadata keys and the second hash key to determine a match, responsive to a first metadata key that corresponds to a third data object key for a third data object stored in the first alternate storage bucket matching the second hash key, determining that the second target data object is stored in the first alternate storage bucket, and responsive to a determination that the second target data object is stored in the first alternate storage bucket, reading the second target data object from the first alternate storage bucket; that the first storage segment includes a first user-configured number of buckets; the second target storage bucket includes a second user-configured number of bytes, a second data object key includes a third user-configured number of bytes, and the second map includes a fourth user-configured number of bytes; the operations further include, responsive to the second hash key not matching any of the first set of metadata keys: applying a third hash function on the second data object key to calculate a third hash key for the second target data object and, identifying a third target storage bucket in a second storage segment based on the third hash key; the operations further include: reading a fourth data object key for a fourth data object stored in the third target storage bucket, comparing the fourth data object key and the second hash key to determine a match, responsive to the fourth data object key and the second hash key matching, determining that the fourth data object is the second target data object, and responsive to a determination that the fourth data object is the second target data object, reading the second target data object from the third target storage bucket; the operations further include, responsive to the fourth data object key and the second hash key not matching, determining that the fourth data object and the second target data object are different data objects, responsive to determining that the fourth data object and the second target data object are different data objects: reading a second set of metadata keys in second metadata, comparing the second set of metadata keys and the second hash key to determine a match, responsive to a second metadata key that corresponds to a fifth data object key for a fifth data object stored in a second alternate storage bucket matching the second hash key, determining that the second target data object is stored in the second alternate storage bucket, and responsive to a determination that the second target data object is stored in the second alternate storage bucket, reading the second target data object from the second alternate storage bucket, the second storage segment being one hop away from the first storage segment, the second storage segment comprising the second alternate target storage bucket, and the second metadata providing a third map of the second set of metadata keys based on second data object keys for second data objects stored in the second storage segment; that the controller performs the operations in association with five remote direct memory access (RDMA) operations; that the operations further include: responsive to the second hash key not matching any of the second set of metadata keys, determining that the second target data object is not stored in the second node;

In general, one innovative aspect of the subject matter described in this disclosure may be embodied in a method, comprising: applying, in association with a first RDMA operation, a first hash function on a target data object to calculate a first hash key for the target data object; identifying, in association with the first RDMA operation, a first target storage bucket for the target data object in a second node based on a second hash key and a first map of a hash table; reading, in association with the first RDMA operation, a first data object key for a first data object stored in the first target storage bucket; comparing, in association with the first RDMA operation, the first data object key and the first hash key to determine a match; responsive to the first data object key and the first hash key not matching, determining, in association with the first RDMA operation, that the first data object and the target data object are different data objects; and responsive to a determination that the first data object and the target data object are different data objects, reading, in association with the first RDMA operation, first metadata to identify a first alternate storage bucket in a first set of storage buckets storing the target data object, a first storage segment comprising the first metadata and the first set of storage buckets, and the first set of storage buckets comprising the first target storage bucket.

These and other implementations may each optionally include one or more of the following features including that the first metadata provides a second map of a first set of metadata keys based on first data object keys for first data objects stored in the first set of storage buckets; and reading the first metadata includes reading the first set of metadata keys; comparing the first set of metadata keys and the first hash key to determine a match; responsive to a first metadata key that corresponds to a second data object key for a second data object stored in the first alternate storage bucket matching the first hash key, determining that the target data object is stored in the first alternate storage bucket; responsive to a determination that the target data object is stored in the first alternate storage bucket, reading the target data object from the first alternate storage bucket; responsive to the first hash key not matching any of the first set of metadata keys, applying, in association with a second RDMA operation, a second hash function on the first data object key to calculate a second hash key for the target data object; identifying, in association with the second RDMA operation, a second target storage bucket in a second storage segment based the second hash key; reading, in association with the second RDMA operation, a third data object key for a third data object stored in the second target storage bucket; comparing, in association with the second RDMA operation, the third data object key and the first hash key to determine a match; responsive to the third data object key and the first hash key matching, determining, in association with the second RDMA operation, that the third data object is the target data object; responsive to a determination that the third data object is the target data object, issuing a third RDMA operation to read the target data object from the second target storage bucket; issuing the second RDMA operation to determine that the third data object and the target data object are different data objects responsive to the third data object key and the first hash key not matching; responsive to determining that the third data object and the target data object are different data objects, issuing the third RDMA operation to read a second set of metadata keys in second metadata, compare the second set of metadata keys and the first hash key to determine a match, responsive to a second metadata key that corresponds to a fourth data object key for a fourth data object stored in a second alternate storage bucket matching the first hash key, determining that the target data object is stored in the second alternate storage bucket, responsive to a determination that the target data object is stored in the second alternate storage bucket, reading the target data object from the second alternate storage bucket, responsive to the first hash key not matching any of the second set of metadata keys, and determining that the target data object is not stored in the second node, the second storage segment being one hop away from the first storage segment, the second storage segment comprising a second alternate target storage bucket, and the second metadata providing a third map of the second set of metadata keys based on second data object keys for second data objects stored in the second storage segment; writing the first data object to the other storage bucket further includes writing the first data object to a second storage bucket in the first target storage segment; updating the first metadata further includes updating the first metadata in the first target storage segment such that the first map indicates that the first data object is stored in the second storage bucket; determining that the first target storage segment is unavailable; determining a second target storage segment that is one hop away from the first target storage segment; writing the first data object to the other storage bucket further includes writing the first data object to a second storage bucket in the second target storage segment; updating the first metadata further includes updating the first metadata in the second target storage segment such that the first map indicates that the first data object is stored in the second storage bucket; determining that the first target storage segment is unavailable; determining a second target storage segment that is one hop away from the first target storage segment; determining that the second target storage segment is unavailable; determining a third target storage segment that is one hop away from the second target storage segment; relocating a second data object in a second storage bucket in the second target storage segment to a third storage bucket in the third target storage segment to free up the second storage bucket; updating a second map in second metadata of the third target storage segment to indicate that the second data object is stored in the third storage bucket; writing the first data object to the other storage bucket further includes writing the first data object to the second storage bucket in the second target storage segment; updating the first metadata further includes updating the first metadata in the second target storage segment such that the first map indicates that the first data object is stored in the second storage bucket.

In general, one innovative aspect of the subject matter described in this disclosure may be embodied in a method, comprising: performing, by a computing node, a hash function on a first data object to determine a first storage bucket in a first target storage segment where the first data object is storable; determining that the first storage bucket is unavailable; writing the first data object to another storage bucket in response to the determination, and updating a first map in first metadata of a storage segment to indicate that the first data object is stored in the other storage bucket.

These and other implementations may each optionally include one or more of the following features: writing the first data object to the other storage bucket further includes writing the first data object to a second storage bucket in the first target storage segment; updating the first metadata further includes updating the first metadata in the first target storage segment such that the first map indicates that the first data object is stored in the second storage bucket; determining that the first target storage segment is unavailable; determining a second target storage segment that is one hop away from the first target storage segment; writing the first data object to the other storage bucket further includes writing the first data object to a second storage bucket in the second target storage segment; updating the first metadata further includes updating the first metadata in the second target storage segment such that the first map indicates that the first data object is stored in the second storage bucket; determining that the first target storage segment is unavailable; determining a second target storage segment that is one hop away from the first target storage segment; determining that the second target storage segment is unavailable; determining a third target storage segment that is one hop away from the second target storage segment; relocating a second data object in a second storage bucket in the second target storage segment to a third storage bucket in the third target storage segment to free up the second storage bucket; updating a second map in second metadata of the third target storage segment to indicate that the second data object is stored in the third storage bucket; writing the first data object to the other storage bucket further includes writing the first data object to the second storage bucket in the second target storage segment; and updating the first metadata further includes updating the first metadata in the second target storage segment such that the first map indicates that the first data object is stored in the second storage bucket.

The technology disclosed herein provides a number of advantages and benefits over prior solutions, including, but not limited to, being more reliable and/or more efficient than other storage networks and/or systems, such as those described in the Background, providing hardware and/or software with functionality to avoid or at least decrease the issues related to reliability and/or latency associated with reading data objects that are not properly and/or accurately mapped in a hash table, and eliminating or decreasing the latency issues associated with requests to write data to selected storage locations that may be unavailable at the time of selection. It should be understood that the foregoing advantages and benefits are provided by way of example and that the technology may have numerous further advantages and benefits. Further, it should be understood that the Summary describes various example aspects of the subject matter of this disclosure and is not intended to encompass every inventive aspect.

It should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

The innovative technology disclosed herein includes various aspects, such as systems, methods, apparatuses, computer-readable media, computer program products, etc., for managing input/output (I/O) operations, such as write and read operations, for data objects in a storage network and/or system.

As discussed further herein, the various embodiments disclosed below include hardware and/or software may avoid or decrease latency issues associated with write requests when a selected storage location for storing a data object may be unavailable. Furthermore, the various embodiments disclosed herein may include hardware and/or software to advantageously increase storage network and system reliability and/or decrease latency issues associated with reading data objects in long-term storage. These embodiments are advantageously more efficient and/or more reliable than some previous storage networks and/or systems utilized to store data objects, such as when the data objects may not be properly and/or accurately mapped in a hash table.

Figure 1:
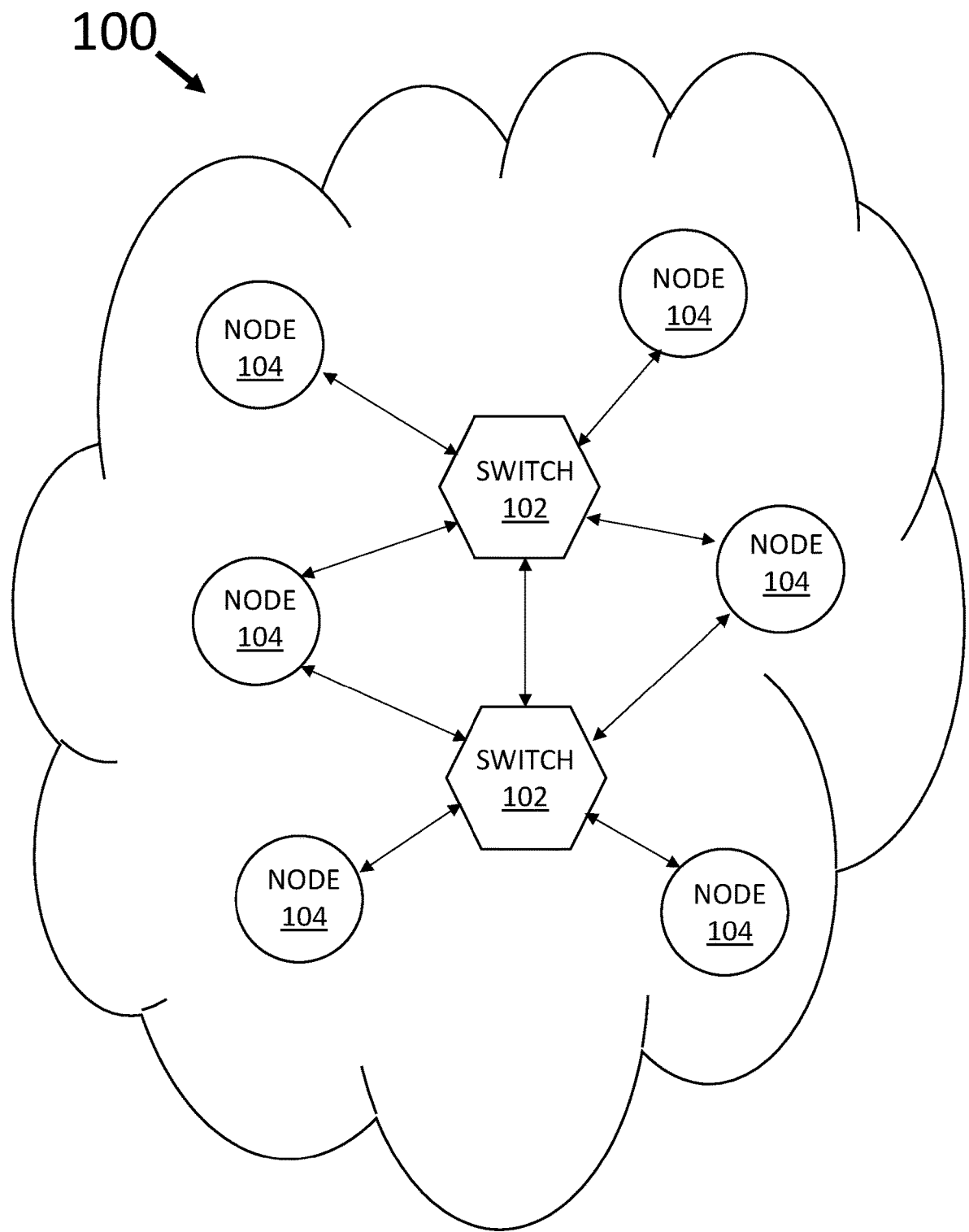
FIG. 1 is a diagram of an example computing network for storing data.

Turning now to the drawings, FIG. 1 is a diagram of an example computing network 100. The computing network 100 may be any suitable type of computing network that is known or developed in the future and is capable of enabling multiple computing devices and/or nodes to communicate with one another and/or share resources. In various embodiments, can comprise a cloud network (IAN), a SAN (e.g., a storage area network, a small area network, a server area network, and/or a system area network), a wide area network (WAN), a local area network (LAN), a wireless local area network (WLAN), a metropolitan area network (MAN), an enterprise private network (EPN), a virtual private network (VPN), and/or a personal area network (PAN), among other examples of private and/or public computing networks and/or or sets of computing devices that are possible and contemplated herein.

In addition, the computing network 100 can include any suitable fabric and/or topology that is known or developed in the future and is capable of enabling multiple computing devices and/or nodes to communicate with one another and/or share resources. Examples of suitable fabrics and/or topologies include, but are not limited to, a switched fabric topology, a mesh topology, a star topology, a bus topology, a ring topology, and/or a tree topology, etc., among other example fabrics and/or topologies that are possible and contemplated herein.

Further, the computing network 100 can employ any suitable type of communication architecture and/or protocol that is known or developed in the future and is capable of enabling multiple computing devices and/or nodes to communicate with one another. Examples of suitable communication architectures and/or protocols include, but are not limited to, InfiniBand (TB), Remote Direct Memory Access (RDMA), IB over RDMA Internet Protocol (IP), Transmission Control Protocol/Internet Protocol (TCP/IP), Ethernet, Fibre Channel (FC), Advanced Technology Attachment (ATA), ATA-over-Ethernet (AoE), parallel ATA (PATA), Serial ATA (SATA), Small Computer System Interface (SCSI), Internet Small Computer System Interface (iSCSI), an optical network, Network File System (NFS), FC-over-IP (FCIP), Non-Volatile Memory Express (NVMe), NVMe-over-RDMA, iSCSI Extensions for RDMA (iSER), SCSI RDMA Protocol (SRP), Fibre Channel-over-Ethernet (FCoE), Enterprise Systems Connection (ESCON), Fibre Connection (FICON), ATA-Over-Ethernet (AoE), and/or Internet Fibre Channel Protocol (IFCP), etc., among other examples of communication architectures and/or protocols and combinations thereof that are possible and contemplated herein.

As shown in FIG. 1, the computing network 100 may include, among other components, one or more switches 102 that can be utilized to couple multiple computing nodes 104 to one another and provide one or more communication paths and/or channels there between. While various embodiments described herein may refer to particular network protocols and/or types, such as an IB network including a switched fabric topology, other suitable fabrics/topologies, and/or communication architectures/protocols are also applicable.

A switch 102 may include any type of switching device and/or system that is known or developed in the future and is capable of coupling computing devices, nodes, and/or switches to one another to create a communication path and/or communication channel between two or more computing devices, nodes, and/or switches. The computing network 100 may include any number of switches 102 to create one or more communication paths and/or communication channels between the computing nodes 104 and is not limited to the embodiment shown in FIG. 1 that includes two (2) switches 102 coupling six (6) computing nodes 104 to one another.

A computing node 104 can include any suitable computing hardware and/or software capable of performing computer processes, functions, and/or algorithms. Specifically, a computing node 104 may be configured to transmit RDMA operations to read, write, store, communicate, propagate, and/or transport instructions, data/data objects, computer programs, software, code, routines, etc., to/from memory in another computing node 104. Examples of a computing node 104 include, but are not limited to, a client device/system, a peer device/system, and/or a computing server, etc., among other examples of computing hardware and/or software that are possible and contemplated herein.

Some computing nodes 104, as part of their respective operation, provide a client device that send I/O requests, such as RDMA operations, to one or more other computing nodes 104 (e.g., a storage device/system, computing server, etc.) to write data, read data, and/or modify stored data. In general, a computing node 104 (e.g., a storage device/system, computing server, etc.) can be accessed by other computing nodes 104 and/or communication between computing nodes 104 can be initiated through a stream socket (not shown) utilizing one or more inter-process networking techniques.

Figure 2A:
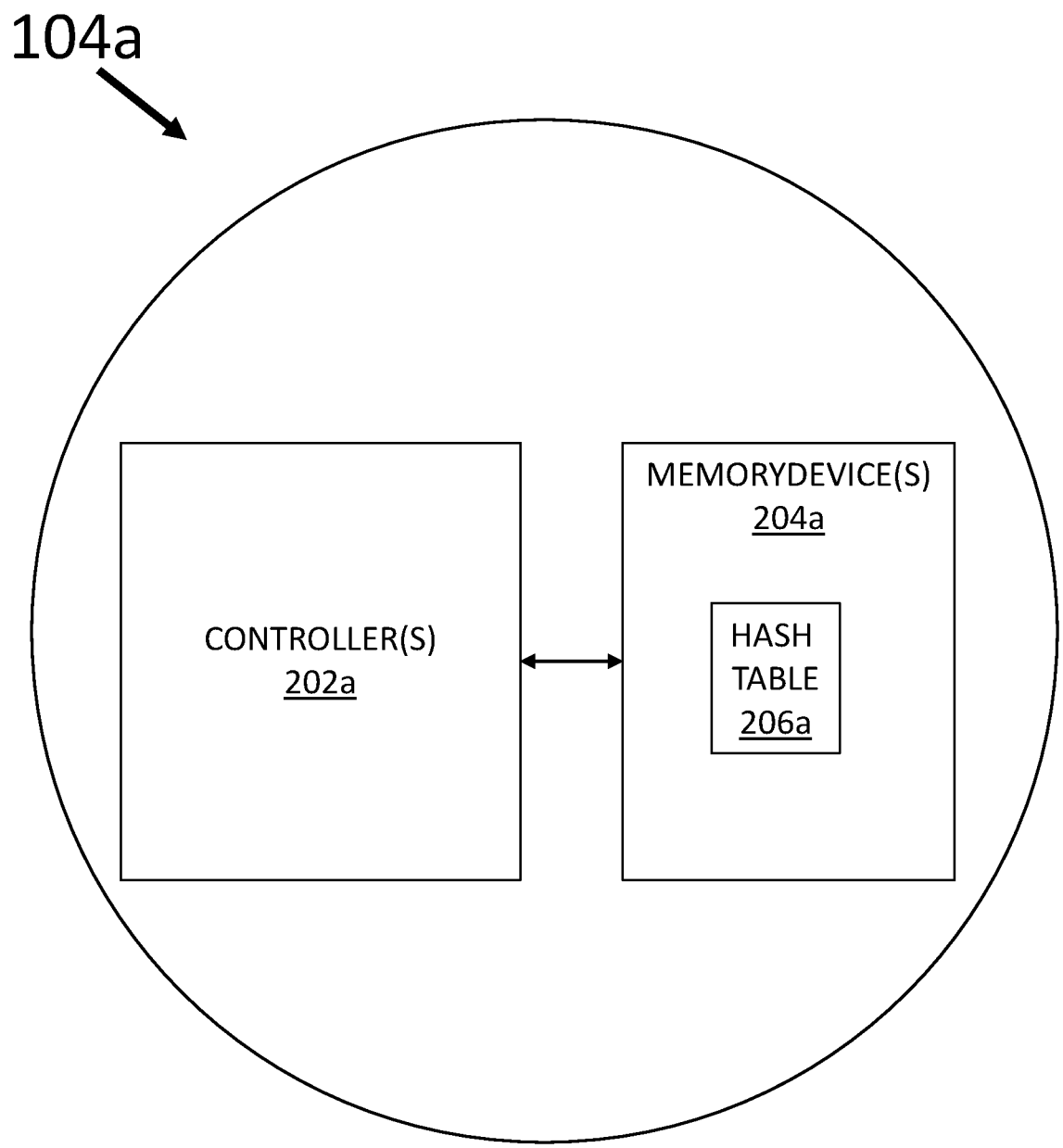
FIGS. 2A-2C are diagrams of example computing nodes that may be included in the computing network of FIG. 1.

With reference now to FIG. 2A, a diagram of an example computing node 104a is illustrated. As shown, the computing node 104a may comprise, among other components, one or more controllers 202a coupled to and in communication with one or more memory devices 204a. A controller 202a may comprise any processing hardware and/or software that is known or developed in the future and is capable of performing computer processes, functions, and/or algorithms, especially transmitting I/O requests and/or performing I/O operations, as discussed elsewhere herein.

A memory device 204a may comprise any type of non-transitory hardware that is known or developed in the future and is capable of storing data that can be read, written, and/or modified via an I/O operation. In various embodiments, a memory device 204a may store at least a portion of a hash table 206a that can be utilized to locate where data objects are stored in one or more of the computing nodes 104.

A hash table 206a may include any collection, set, cache, tree, table, database, index, and/or array of data with a data structure that can provide a map of the location(s) in one or more of the computing nodes 104 storing a set of data objects. In various embodiments, a hash table 206a may assign a key to each respective storage bucket in each respective storage segment. A key can be used to assist in determining the location or address of a particular data object that is stored in computing network 100. That is, a key can be utilized to identify the computing node 104, storage segment, and/or storage bucket that is storing a particular data object.

In some embodiments, a hash table 206a may map keys to data object values and use a hash function to compute an index into a set or an array of storage buckets or storage slots from which a data object value for a desired data object can be calculated. The calculated data object value can be compared to a key corresponding to one or more storage buckets and the location/address of the desired data object can be determined when the calculated data object value for the desired data object and the key for a particular storage bucket match one another.

Figure 2B:
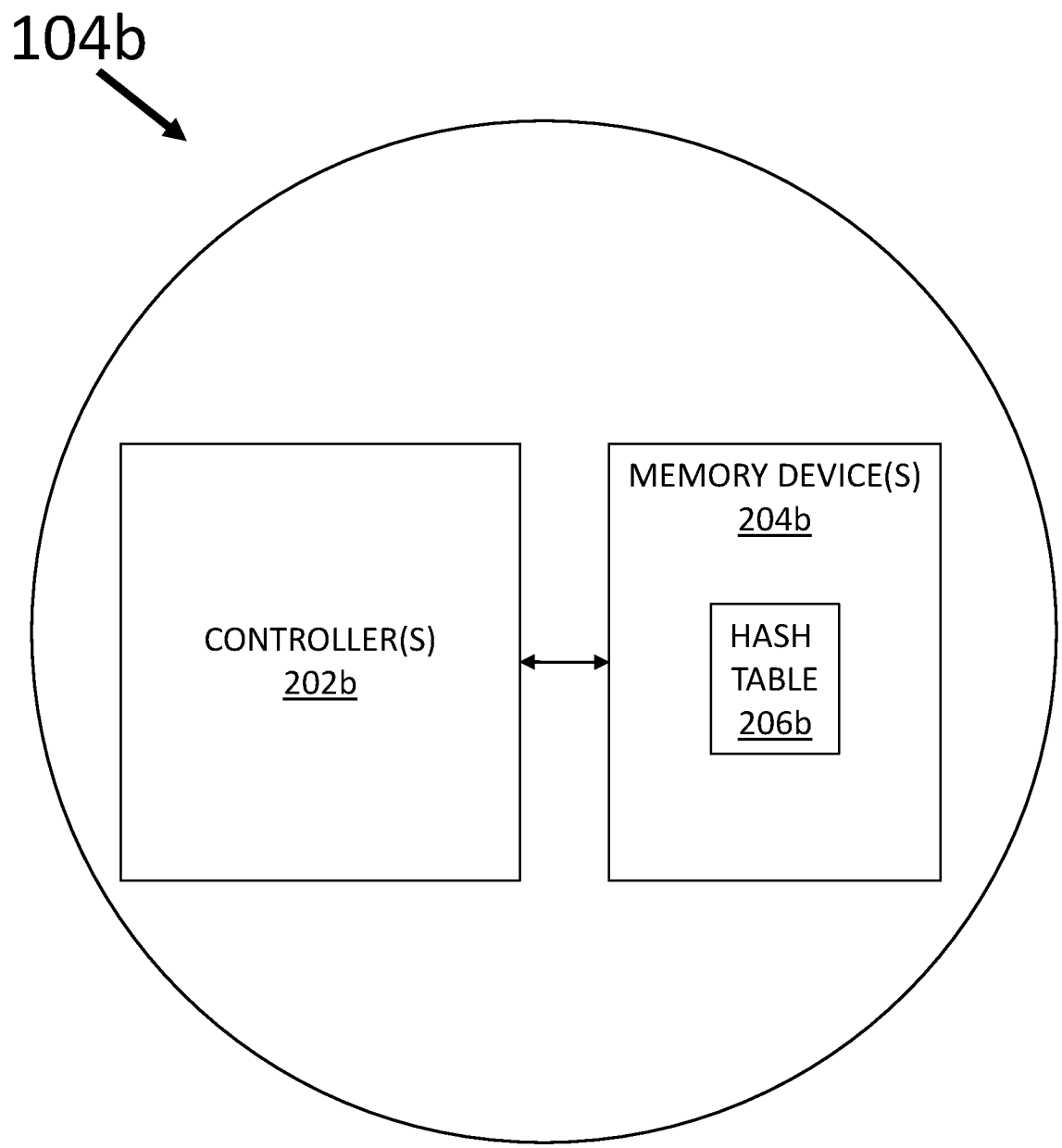

Some embodiments of computing network 100 can provide a distributed hash table 206b, as shown in FIG. 2B. FIG. 2B is a diagram of an example computing node 104b that may comprise, among other components, one or more controllers 202b coupled to and in communication with one or more memory devices 204b similar to the computing node 104a discussed above with reference to FIG. 2A. As shown in FIGS. 2A and 2B, a first portion of the hash table 206a may be stored in the computing node 104a and a second portion of the hash table 206b may be stored in the computing node 104b so that the hash table (collectively, hash table 206) is distributed across multiple computing nodes 104a, 104b, etc.

While FIGS. 2A and 2B show the hash table 206 being distributed between two (2) computing nodes 104, various other embodiments of the computing network 100 may distribute the hash table 206 between more than two computing nodes 104. That is, computing network 100 may distribute the hash table 206 between any number of computing nodes 104 and is not limited to storing the hash table 206 on a single computing node 104 or distributed between two computing nodes, as depicted in FIG. 2A and the combination of FIGS. 2A and 2B, respectively.

In various embodiments, a portion of the hash table (e.g., 206a and/or 206b) may provide a map to storage locations or addresses for data objects that are stored on the computing node 104 on which the portion of the hash table 206a/206b resides, to storage locations or addresses for data objects that are stored on a computing node 104 on which the portion of the hash table 206a/206b does not reside, and/or both. Further, the portions of the hash table 206a/206b may be configured the same or differently. In some embodiments, the hash table 206a may provide a map to storage locations or addresses for data objects that are stored on the computing node 104a and the hash table 206b may provide a map to storage locations or addresses for data objects that are stored on computing nodes 104a and 104b. In further embodiments, the hash table 206a may provide a map to storage locations or addresses for data objects that are stored on the computing node 104b and the hash table 206b may provide a map to storage locations or addresses for data objects that are stored on computing node 104a. In further embodiments, the hash table 206a may provide a map to storage locations or addresses for data objects that are stored on the computing nodes 104a and 104b and the hash table 206b may provide a map to storage locations or addresses for data objects that are stored on computing node 104a. Further, the hash table 206a may provide a map to storage locations or addresses for data objects that are stored on the computing node 104a and the hash table 206b may provide a map to storage locations or addresses for data objects that are stored on computing node 104b. Additionally or alternatively, the hash table 206a may provide a map to storage locations or addresses for data objects that are stored on the computing node 104b and the hash table 206b may provide a map to storage locations or addresses for data objects that are stored on computing node 104a. In some embodiments, the hash table 206a may provide a map to storage locations or addresses for data objects that are stored on computing nodes 104a and 104b and the hash table 206b may also provide a map to storage locations or addresses for data objects that are stored on computing nodes 104a and 104b.

Figure 2C:
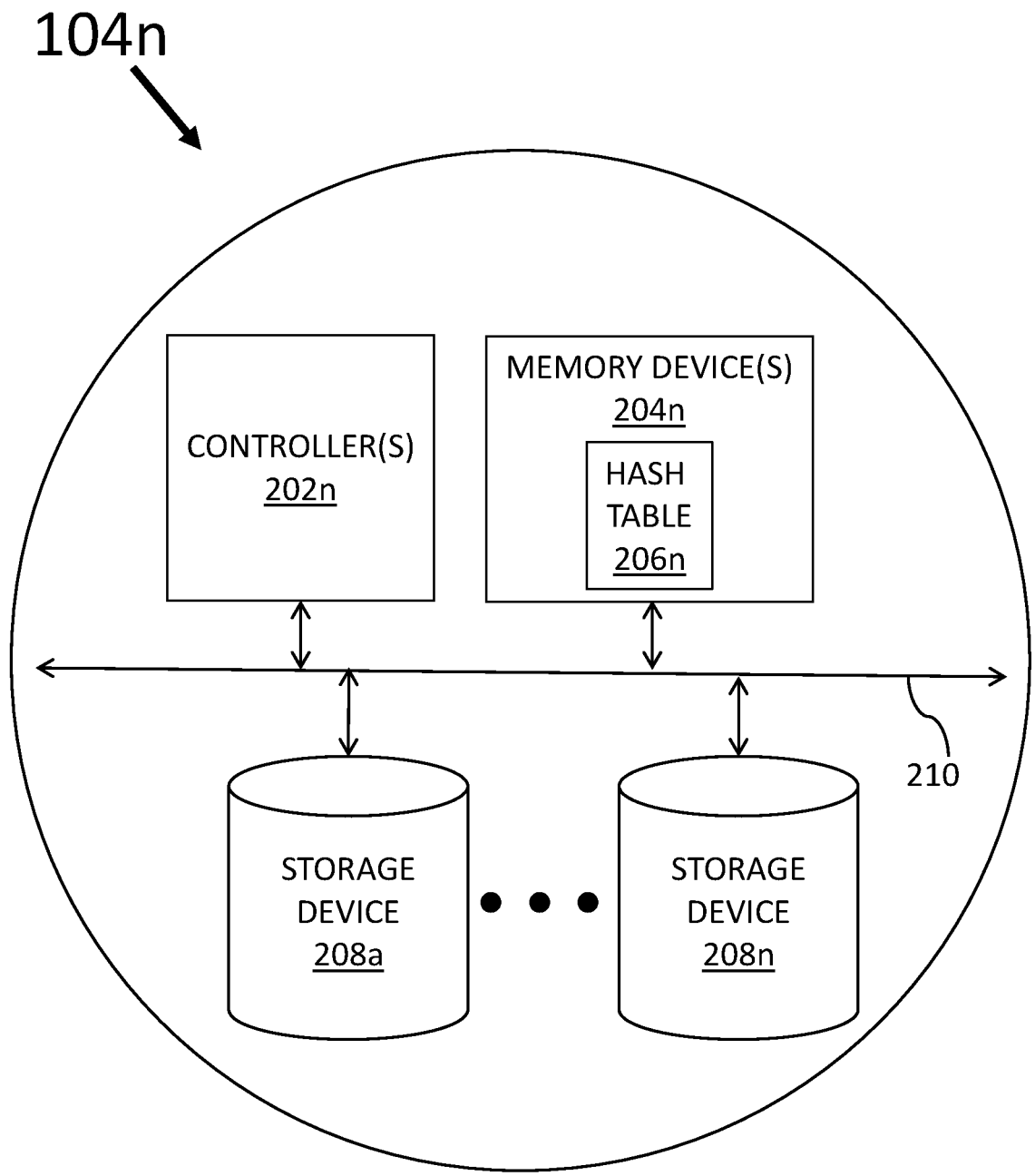

Referring now to FIG. 2C, an example computing node 104n is illustrated. As shown, the computing node 104n may include, among other components, one or more controllers 202n, one or more memory devices 204n that may include at least a portion of a hash table 206n, and multiple storage devices 208a through 208n (also simply referred individually, in various groups, or collectively as storage device(s) 208) coupled to and in communication with one another via a wired and/or wireless bus 210. Controller(s) 202n, memory device(s) 204n, and the hash table 206n may be similar to the controllers 202, the memory devices 204, and the hash table(s) 206, respectively, discussed elsewhere herein.

In some embodiments of the computing node 104n, such as computing node 104, the computing node 104 may access data objects and/or the hash table 206 from a remote source. For instance, instead of storing data locally, or to supplement locally stored data, the computing node 104n may retrieve data remotely.

Storage devices 208 may be any type of storage device that is known or developed in the future and is capable of storing data and/or data objects. In various embodiments, a storage device 208 may include one or more non-transitory computer-usable (e.g., readable, writable, modifiable, etc.) mediums, which may include any non-transitory and/or persistent apparatus or device that can contain, store, communicate, propagate, and/or transport instructions, data, computer programs, software, code, routines, etc., for processing by or in connection with a computer processing device.

In various embodiments, storage devices 208 can be implemented as flash memory (e.g., a solid-state device (SSD) or another non-volatile storage device that stores persistent data or persistent storage device). In further embodiments, storage devices 208 may include non-transitory memory such as, for example, a dynamic random access memory (DRAM) device, a static random access memory (SRAM) device, a hard disk drive (HDD), and/or storage tape (e.g., magnetic and/or virtual), among other types (e.g., non-volatile and/or persistent) of memory devices. In various embodiments, the storage devices 208 may be the same type of storage device or at least two storage devices 208 may be different types of storage devices.

Further, a storage device 208 may include hardware and/or software to divide and/or partition its physical storage space into two or more smaller storage units that can be referred to herein as storage segments. A storage device may include any quantity of storage segments and an amount of space provided in each storage segment may be the same amount of space or at least two storage segments may include different amounts of storage space.

The physical space in a storage segment may be divided and/or partition into two or more smaller storage units that can be referred to herein as storage buckets. A storage segment may be divided/portioned into any number of storage buckets and a storage bucket can include a structure to store data that is grouped together, which may be referred to herein as a data object. In some embodiments, one or more storage segments may be divided/partitioned to include a user-configured number of buckets (e.g., about 256, 512, 1024, etc. storage buckets, etc.), although other variations and/or quantities are possible and contemplated herein.

A storage bucket can store a data object or at least a portion of a data object and may include any size or provide any amount of storage space. In some embodiments, a storage bucket may include a user-configured size, such as a size of 256, 512, 1024, etc., bytes, although other configuration variations and/or quantities are possible and contemplated herein. An amount of space provided in each storage bucket may be the same amount of space or at least two storage buckets may include different amounts of storage space.

Further, a storage bucket may store a key that can provide a representation of the data, data object, and/or portion stored therein and may include any size or quantity of data.

In some embodiments, a key may include a size of about 256 bits (32 bytes), although other sizes are possible and contemplated herein.

Figure 3A:
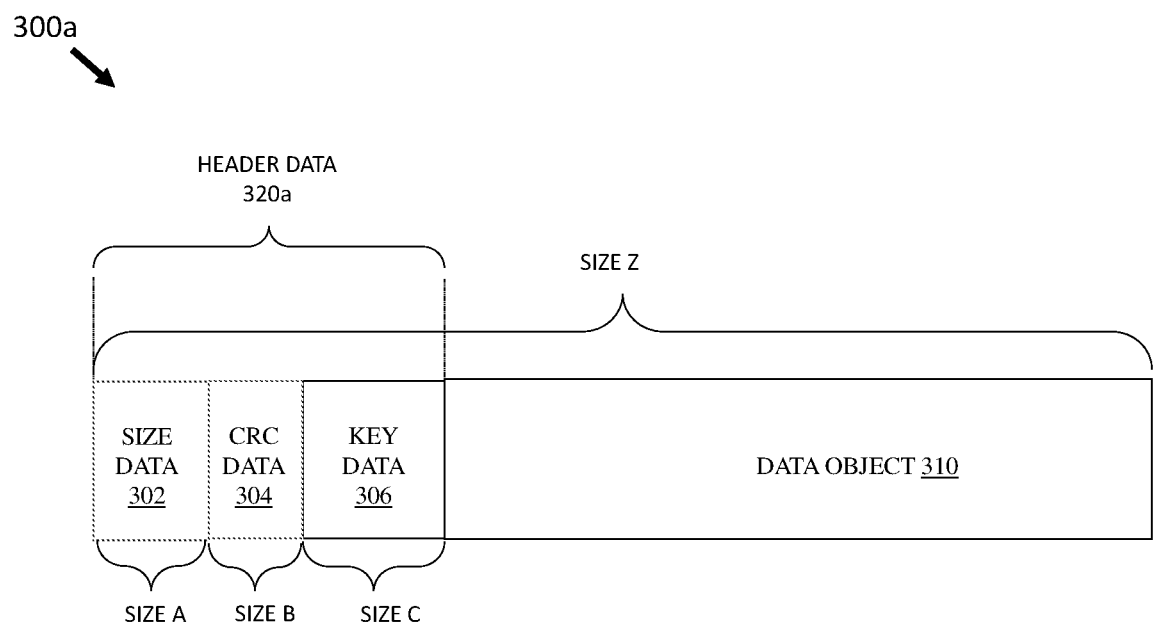
FIGS. 3A and 3B are diagrams of example storage buckets.

With reference to FIG. 3A, an example storage bucket 300a is illustrated. As shown, the storage bucket 300a may include a given size (Size Z) and can store header data 320a and one or more data objects or portions of one or more data objects. The header data 320a may include various data describing the data objects 308 and/or storage bucket 300a. For instance, the header data 320a may include size data 302 having a first size (size A), cyclic redundancy check (CRC) code 304 having a second size (size B), key data 306 having a third size (size C), although numerous other variations are also possible and contemplated. In a non-limiting example, the size data 302 may include a size in the range of about nine (9) bits to about eight (8) bytes, the CRC code 304 may include a size of about thirty-two (32) bytes, and the key data 306 may comprise a size of about thirty-two (32) bytes. In this example, the data object 308 fills the remainder of the storage bucket 300a.

As shown, the storage bucket 300a includes a size that allows the data object 308 to be stored entirely within the storage bucket 300a and, as such, the data object 308 may be considered a relatively small-sized data object. While the size data 302, the CRC code 304, the key data 306, and the data object 308 are discussed as including a specific range of sizes and/or size, storage bucket 300a is not limited to such range of sizes and/or sizes. That is, various other embodiments of the storage bucket 300a may utilize other possible ranges of size and/or sizes for the size data 302, the CRC code 304, the key data 306, and/or the data object 308, each of which is contemplated herein.

Figure 3B:
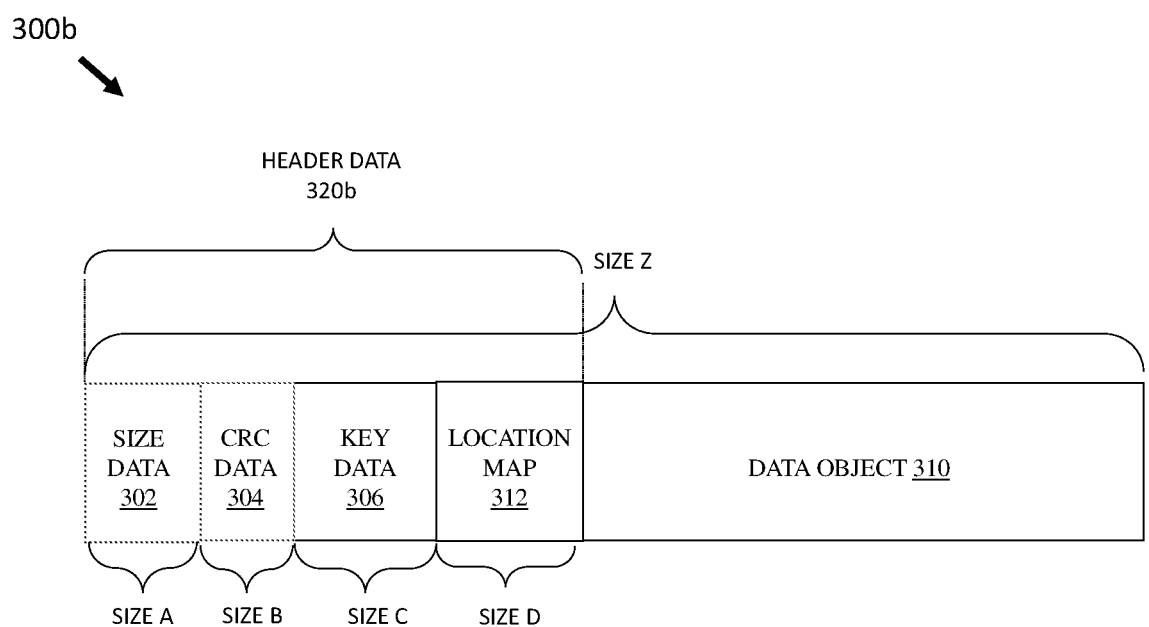

With reference to FIG. 3B, an example storage bucket 300b is illustrated. As shown, the storage bucket 300b may include a given size (Size Z) and can store header data 320b and one or more data objects or portions of one or more data objects. The header data 320b may include various data describing the data objects 308 and/or storage bucket 300b. For instance, the header data 320b may include size data 302 having a first size (size A), CRC code 304 having a second size (size B), and key data 306 having a third size (size C) similar to the storage bucket 300a, although numerous other variations are also possible and contemplated. As shown, in this example, the storage bucket 300b includes a size that does not allow a data object 310 to be stored entirely within the storage bucket 300b and, as such, the data object 310 may be considered a relatively large-sized data object.

Additionally or alternatively, the header data 320b of the storage bucket 300b may include a location map 312 that identifies one or more other storage buckets storing the remaining portion(s) of the data object 310 that stores the one or more other remaining portions of the data object 310. As a further example, the data object 310 may be divided into a plurality of portions (a first portion, a second portion, etc.) that are stored in different storage buckets 300. The storage bucket 300b may store the first portion and the location map 312 may identify in which storage buckets 300 the other portions are stored (e.g., second portion, etc.). The location map 312 may have a particular data size (Size D) that fills a portion of the storage bucket 300b. As a further non-limiting example, the location map 312 may include a data size of about sixty-four (64) bytes, although other data sizes are possible and contemplated herein. Further, the location map 312, in some embodiments, may be considered at least a portion of the metadata of a storage segment including the storage bucket 300b and can be used to assist in locating one or more portions of the data object 310, as discussed elsewhere herein.

As noted, while the size data 302, the CRC code 304, the key data 306, the data object 310, and the location map 312 are discussed as including a specific range of sizes and/or size, storage bucket 300b is not limited to such range of sizes and/or sizes. That is, various other embodiments of the storage bucket 300b may utilize other possible ranges of size and/or sizes for the size data 302, the CRC code 304, the key data 306, the data object 310, and/or the location map 312, each of which is contemplated herein.

In various embodiments, one or more storage segments may include/store metadata that provides information related to its storage buckets. The metadata may be stored in any of the storage buckets of a particular storage segment. In some embodiments, the metadata may be stored in the first physical storage bucket or logical location, among other possible locations that are contemplated herein.

In some embodiments, the metadata may include status data for each of the storage buckets in a storage segment. Status data may provide an indication of whether a storage bucket is currently storing data. The status data, in some embodiments, may include a bit map in which a "1" indicates that a storage bucket is storing data and a "0" indicates that the storage bucket is empty or vice-versa. For instance, the status data for a storage segment including five hundred twelve (512) storage buckets may include a size of about five hundred twelve (512) bits (64 bytes) since the bit map may provide one (1) bit for each storage bucket.

The metadata may further include a write lock feature that prevents the storage buckets in the storage segment from being written to while one or more read operations are being performed in the storage segment. The write lock may include a data size of about sixty-four (64) bits (8 bytes), although other data sizes are possible and contemplated herein.

In various embodiments, the metadata may provide a map of the keys (e.g., a key map) for the data objects stored in each respective storage bucket. In various embodiments, the keys stored in the metadata may each include a size of about sixteen (16) bits (2 bytes), although other sizes are possible and contemplated herein. For example, while a key stored in a storage bucket may include a first size (e.g., predefined, user-configured, etc., such as a size of 32 bytes, etc.), a key in the metadata corresponding to the key in the storage bucket may include a second size (e.g., predefined, user-configured, etc., such as a size of 2 bytes, etc.), although other values are also possible and contemplated.

Various storage segments may include different amounts and/or sizes of metadata depending on the contents and/or features of each storage segment. For instance, metadata for a storage segment including five hundred twelve (512) storage buckets may comprise a size of about one thousand ninety-six (1096) bytes (e.g., 64 bytes for a bit map, 8 bytes for a write lock feature, and 1024 bytes for a key map), although it should be understood that these specific values for the storage buckets, bit-map, write lock, and/or key map, etc., are provided by way of example and other values may apply based on use-case, need, system requirement, capability, etc. (e.g., user-configured based on various requirements, predefined, etc.).

With reference to FIGS. 1 through 2C, one or more of the computing nodes 104 may directly access resources in one or more other remote computing nodes 104 using a suitable RDMA protocol. Example RDMA protocols may include, but are not limited to, Virtual Interface Architecture (VIA), InfiniBand RDMA, RDMA over Converged Ethernet (RoCE), Non-Volatile Memory Express over RDMA (NVMe-over RDAM), iSCSI Extensions for RDAM (iSER), SCSI RDMA Protocol (SRP), and internet Wide Area RDMA Protocol (iWARP), etc., although other RDMA protocols are possible and contemplated herein.

In some embodiments, the controller 202 of a computing node 104 may access data directly by performing RDMA operations (e.g., RDMA write operations and/or RDMA read operations) on one or more other computing node(s) 104 without involving the controller(s) 202 in the other computing node(s) 104. In some embodiments, one or more computing nodes 104 can access the storage device(s) 208 in the computing node 104n (see FIG. 2C) to write data objects to, read data objects from, and/or perform other I/O operations related to writing/reading data objects to the storage device(s) 208. Additionally or alternatively, one or more computing nodes 104 can directly access memory in one or more other computing nodes 104 to write data to, read data from, and/or perform other I/O operations related to writing/reading data on a hash table 206 and/or portions thereof. For instance, the controller(s) 202a in the computing node 104a (see FIG. 2A) may perform RDMA operations to directly write data objects to, read data objects from, and/or perform other I/O operations related to writing/reading data objects on the storage device(s) 208 (see FIG. 2C) and may further perform RDMA operations to directly read, write/update, and/or perform other I/O operations on the hash table 206b in the computing node 104b (see FIG. 2B) in conjunction with the RDMA operations performed on the computing node 104n.

A computing node 104 that initiates I/O operations (e.g., a source computing node) can utilize RDMA write operations to directly write data objects to storage devices 208 in a computing node 104 (e.g., computing node 104n), update a hash table 206 that maps the storage locations of data objects, and/or update metadata in storage segments that maps keys for data objects stored therein to storage buckets storing data objects corresponding to each key. Further, the RDMA operations may allow a source computing node 104 to utilize RDMA read operations to directly read data objects from the storage devices 208 in a computing node 104 (e.g., computing node 104n), read the hash table 206, and/or read metadata in storage segments. Various RDMA operations may perform a hash function on a data object to determine a storage bucket in a particular storage segment where the data object can be stored, which can be referred to a target storage bucket and a target storage segment, respectively.

Some RDMA write operations may update a hash table 206 so that a data object is mapped to a target storage bucket based on the hash function, which mapping can occur prior to the data object being actually written (e.g., via a RDMA write operation) to a storage bucket that may not be the target storage bucket. Further RDMA write operations can write a data object directly to a storage bucket. Some RDMA operations may generate a key for a data object after the data object is written to a storage bucket, update the metadata in the storage segment with the generated key, and correlate the generated key with the storage bucket storing the data object.

Figure 4:
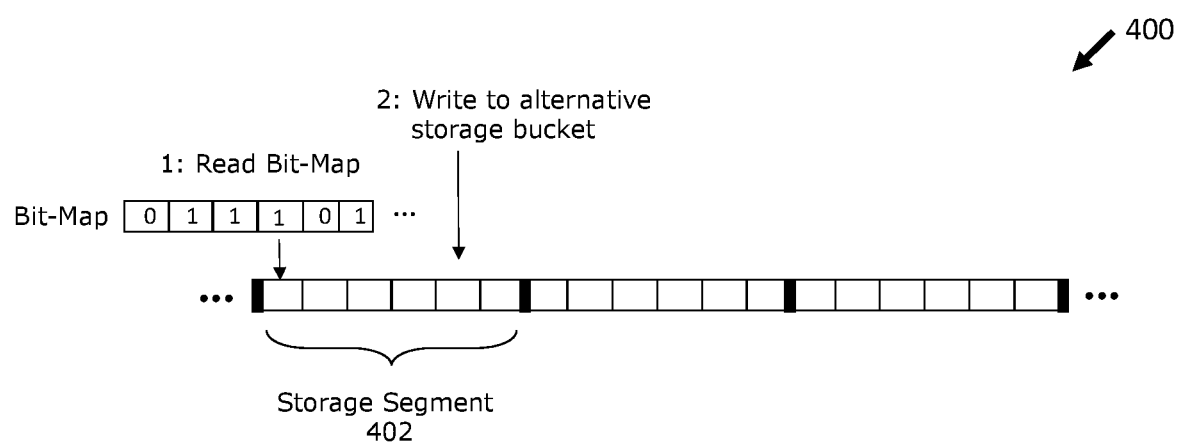
FIG. 4 is a flow diagram of an example contingent storage process.

In some instances, a target storage bucket in a target storage segment may currently have another data object or portion thereof mapped to it, which renders the target storage bucket unavailable for storing a new data object. To address this situation, some RDMA operations may be included in a contingent storage process 400, as shown is FIG. 4.

Some contingent storage processes 400 can begin by a RDMA read operation issued by a source computing node 104 reading a bit map in the metadata of the target storage segment (T1), which may be located in the first storage bucket of a storage segment 402, to determine an available alternative storage bucket. As discussed elsewhere herein, a bit map can indicate the availability status of each storage bucket in a target storage segment and can be used to determine a new or alternative storage bucket for storing the data object. After the RDMA read operation determined an available alternative storage bucket, a RDMA write operation issued from the source computing node 104 may write the data object directly to the alternative storage bucket (T2).

Figure 5:
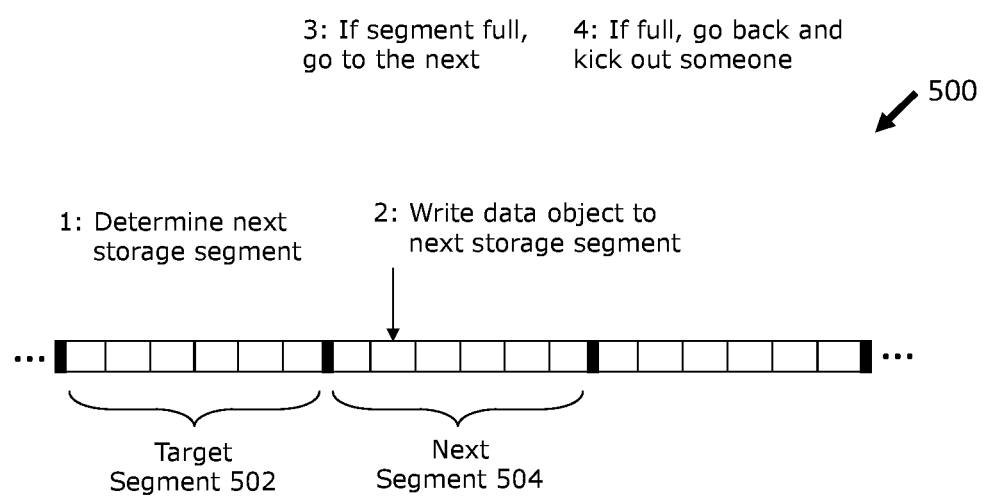
FIG. 5 is a flow diagram of an example write conflict resolution process.

At times, a target storage segment 502 (see FIG. 5) that a RDMA write operation is directed to may be unavailable (e.g., the target storage segment is full, substantially full, offline, etc., or otherwise unavailable). To address this type of situation, some RDMA operations may be included in a write conflict resolution process 500, as shown in FIG. 5.

In various embodiments, a write conflict resolution process 500 may include a RDMA operation issued from the source computing node 104 determining another storage segment into which a data object can be written (T1), which can be referred to herein as a next storage segment 504. In various embodiments, the RDMA operation can determine a next storage segment 504 by rehashing the data object utilizing the hash function used to determine the target storage segment 502. A next storage segment 504 may include any available storage segment in a storage device 208 and may not necessarily be the next sequential or physically adjacent storage segment with respect to a particular storage segment. In some embodiments, a next storage segment 504 can include a next logical storage segment with respect to a particular storage segment.

The write conflict resolution process may continue by a RDMA write operation issued from the source computing node 104 directly writing the data object that is directed to an unavailable target storage segment 502 to a target storage bucket the next storage segment 504 of the target storage segment (T2). In various embodiments, the contingent storage process 400 may be performed if the target storage bucket in the next storage segment 504 has a data object or portion thereof mapped to it (T3).

In various embodiments, storage parameters for the computing system 100 may preclude a write conflict resolution process from writing a data object to a storage segment that is located beyond the next storage segment, more than one storage segment away, or farther than one hop away from the target storage segment. At times, the target storage segment and its next storage segment may both be unavailable, which can present an issue when one or more storage parameters preclude writing a data object farther than one hop away from the target storage segment. To address this situation, some RDMA operations may be included in a spillover process 600, an example of which is depicted in FIG. 6.

Figure 6:
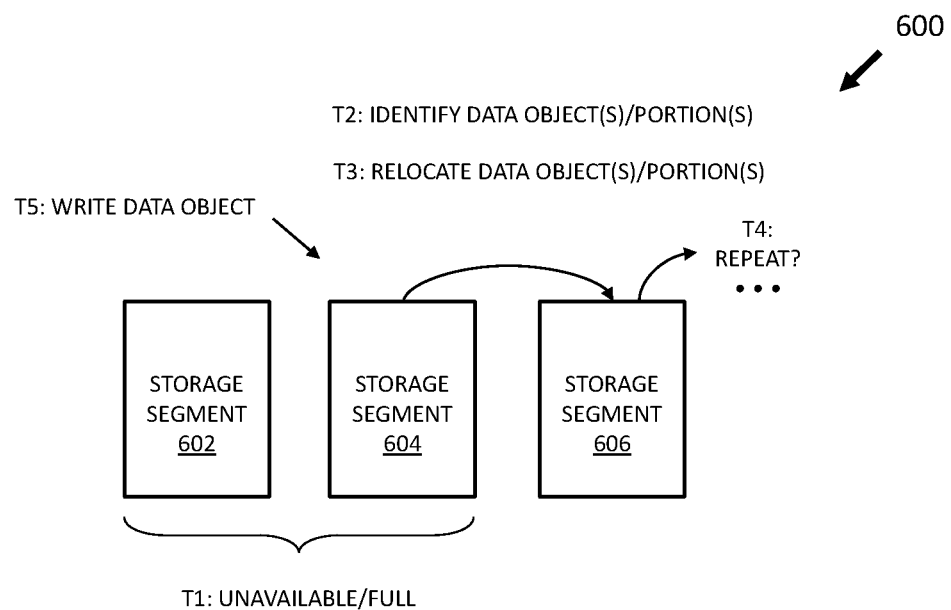
FIG. 6 is a flow diagram of an example spillover process.

As shown in FIG. 6, a storage segment 602 may be a target storage segment, a storage segment 604 may be a next storage segment with respect the storage segment 602, and a storage segment 606 may be a next storage segment with respect to the storage segment 604. In response to an RDMA operation determining that the target storage segment and the next storage segment (e.g., storage segments 602 and 604, respectively, in this example) are both unavailable (e.g., full, offline, etc.) (T1), a RDMA operation in the spillover process 600 may identify one or more data objects and/or portions thereof stored in the storage segment 604 (e.g., the next storage segment with respect to the storage segment 602 in this example) that have not been relocated from the storage segment 602 to the storage segment 604 (T2). For example, the spillover process 600 may identify one or more data objects and/or portions thereof in the next storage segment that are stored in their original or target storage segment (e.g., data object(s) and/or portion(s) in which the storage segment 604 was the target storage segment).

A RDMA write operation may relocate or write the identified data object(s) and/or portion(s) in the storage segment 604 to the storage segment that is one hop away from the next storage segment (e.g., the storage segment 606 in this example) (T3), which can be considered a next storage segment with respect to the next storage segment or a next, next storage segment with respect to the target storage segment. The source computing node 104 may continue the spillover process 600 (e.g., the operations at T2 and T3) by issuing RDMA operations until a next storage segment is capable of storing data, such as one that has storage space available (e.g., that is not full) or within which storage space can be made available via writing data object(s) and/or portion(s) to its next storage segment is eventually identified (T4). Further, various RDMA operations can relocate or write the data object(s) and/or portion(s) in each intervening next storage segment to its respective next storage segment to free up respective storage space so that data object(s) and/or portion(s) from a prior storage segment can occupy the respective freed-up storage space(s) in a chained back manner. This advantageously provides that the data object targeted to the storage segment 602 can ultimately be stored in the storage segment 604. In some embodiments, the spillover process 600 may limit the number of iterations, which can be any quantity and/or be equivalent to the quantity of storage segments in a storage device 208.

A RDMA write operation can write the data object to one or more storage buckets (e.g., 300a/300b in FIGS. 3A/3B, respectively) in the storage segment 604 (e.g., the next storage segment with respect to the storage segment 602) after storage space is made available in the storage segment 604 (T5). The spillover process 600 can effectively free up storage space in one or more next storage segments so that data objects in prior storage segments can be spilled over to their respective next storage segment(s). Advantageously, in this example, a data object targeted to an unavailable storage segment can ultimately be written to a storage device.

Various embodiments of the write conflict resolution process 500 and/or the spillover process 600 may target a data object for relocation based on one or more characteristics of the data object. In some embodiments, relatively large data objects may be selected for relocation before relatively small data objects are selected to free up a greater amount of storage space when relocating a data object.

Referring back to FIGS. 1 through 2C, RDMA operations (e.g., RDMA read operations) from a source computing node 104 can be used to identify and/or directly read data objects from another computing node 104 (e.g., computing node 104n). In various embodiments, a RDMA operation can perform a hash function on a hash table 206 that may be located on the same or another computing node 104 to generate a hash key, which can be used to assist in identifying the storage location of the target data object. In some embodiments, a hash key may include a filename, value, etc., or other type of identifier that is known or may be developed and is capable of identifying a data object. Further, a hash key can be used to identify a target storage bucket within a target storage segment of a target storage device 208, which target storage bucket may or may not be storing the target data object, as discussed further below.

Various RDMA operations may further be directed to the target storage bucket and compare the hash key for the target data object to a key for a data object or portion thereof that is stored in the target storage bucket. If the hash key and the key for the data object or portion thereof stored in the target storage bucket match, some RDMA operations may further determine that the data object or portion thereof stored in the target storage bucket is the target data object and may then directly read the data object to the source computing node 104. Accordingly, a single RDMA operation may be used to locate and read a target data object when the target data object is stored in a target storage bucket identified by a hash key, which is a calculation based on a hash function on a key for the target data object stored in a hash table 206.

If the hash key and the key for the data object or portion thereof stored in the target storage bucket do not match, some RDMA operations may determine that the data object or portion thereof stored in the target storage bucket is not the target data object. Various RDMA operations may further notify the source computing node 104 that one or more additional RDMA operations may be needed to locate and/or read the target data object.

Additional RDMA operations may be directed to the metadata of the target storage segment to read the keys (e.g., two-byte keys) in the key map to determine if one of the keys matches the hash key calculated from the hash table 206. When one of the keys in the key map matches the hash key calculated from the hash table 206, the additional RDMA operation may further determine that the data object stored in the storage bucket that corresponds to the matched key is the target data object and notify the source computing node 104 of the identity of the storage bucket in the target storage segment storing the target data object. Another additional RDMA operation may be issued by the source computing node 104 to read the target data object from the identified storage bucket in the target storage segment. Accordingly, three (3) RDMA operations may be used to identify and read a target data object that is located in a storage bucket of a target storage segment that is not the target storage bucket identified by the hash key.

When none of the keys in the key map matches the hash key calculated from the hash table 206, various additional RDMA operations may determine that the target data object is stored in a storage bucket in the next storage bucket. Further, some additional RDMA operations may notify the source computing node 104 that one or more further additional RDMA operations may be needed to locate and/or read the target data object from the next storage segment relative to the target storage segment.

Some further additional RDMA operations may identify the next storage segment with respect to the target storage segment and be directed to the metadata of the next storage segment. Further additional RDMA operations may read the keys (e.g., two-byte keys) in the key map of the metadata to determine if one of the keys matches the hash key calculated from the hash table 206. When one of the keys in the key map of the next storage segment matches the hash key calculated from the hash table 206, the further additional RDMA operation may further determine that the data object stored in the storage bucket that corresponds to the matched key is the target data object and notify the source computing node of the identity of the storage bucket in the next storage segment storing the target data object. Another further additional RDMA operation may be issued by the source computing node 104 to read the target data object from the identified storage bucket in the next storage segment. Accordingly, five (5) RDMA operations may be used to identify and read a target data object that is located in a storage bucket of a next storage segment. In some embodiments, if none of the keys in the metadata of the next storage segment matches the hash key, a further additional RDMA operation may notify the source computing node 104 that the target data object is not stored in the storage device 208.

Figure 7:
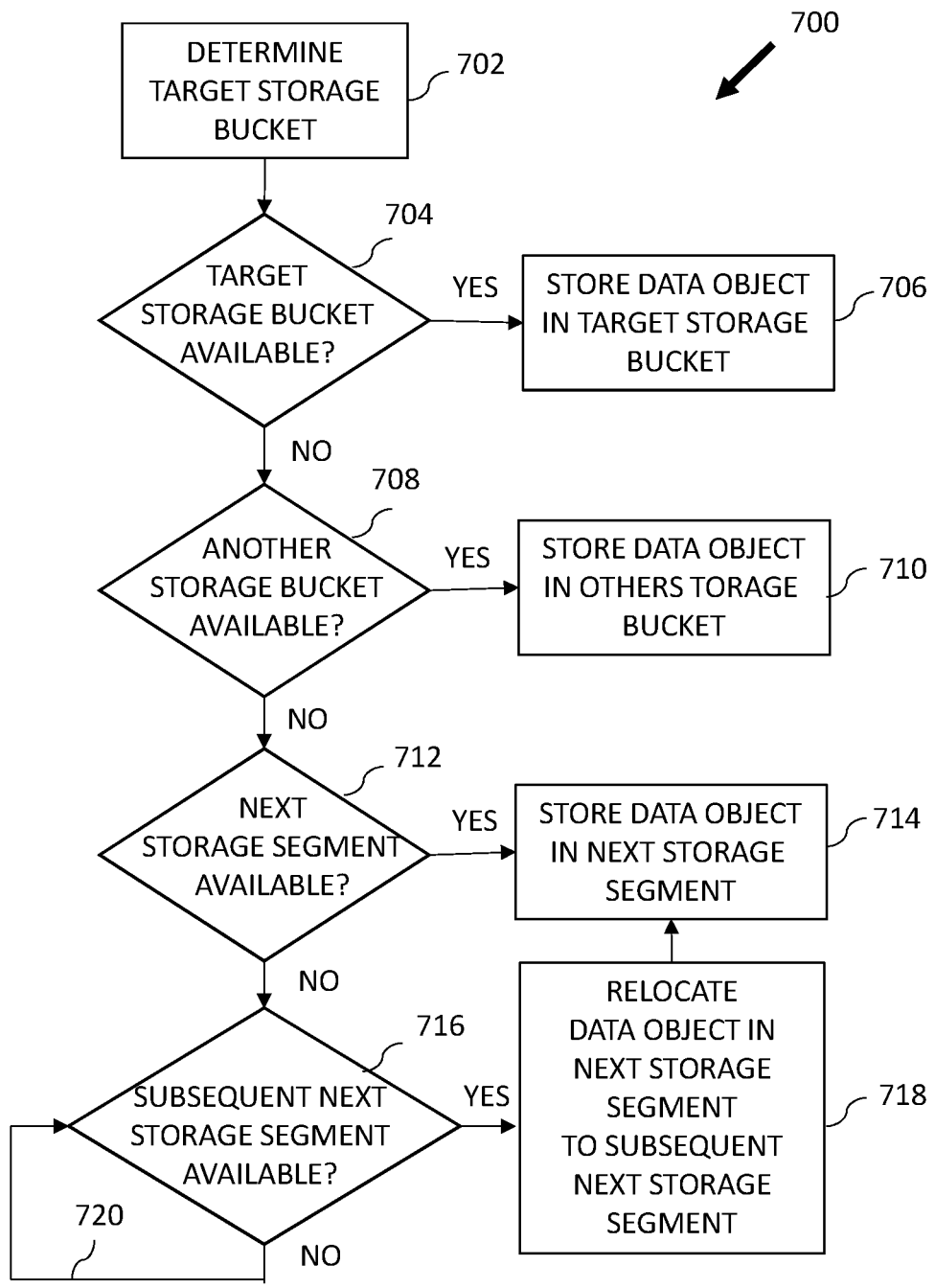
FIG. 7 is a block diagram of an example method of writing data objects to a storage system.

With reference to FIG. 7, an example method 700 for writing a data object to a storage device is illustrated. As shown, method 700 may begin by a source computing node 104 performing (e.g., via a RDMA operation) a hash function on a first data object to determine a first storage bucket in a first target storage segment where the first data object can be stored (block 702).

In some embodiments, the source computing node 104 may determine (e.g., via a RDMA operation) if the target storage bucket is available (block 704), which can be determined using a bit map, as discussed elsewhere herein. If the target storage bucket is available (e.g., a YES), the source computing node 104 can write (e.g., via a RDMA operation) the first data object to the target storage bucket (block 706).

If the target storage bucket is unavailable (e.g., a NO), the source computing node 104 may determine (e.g., via a RDMA and the bit map) if another storage bucket in the target storage segment is available (block 708). If another storage bucket is available (e.g., a YES), the source computing node 104 can write (e.g., via a RDMA operation) the first data object to the other storage bucket (block 710).

If another storage bucket is not available (e.g., a NO), the source computing node may determine (e.g., via a RDMA operation) if a next storage segment that is one hop away with respect to the target storage segment is available (block 712). If the next storage segment is available (e.g., a YES), the source computing node 104 can write (e.g., via a RDMA operation) the first data object to a storage bucket in the next storage bucket (block 714).

If the next storage segment is unavailable (e.g., a NO), the source computing node 104 can determined (e.g., via a RDMA operation) if a subsequent next storage segment that is one hop away with respect to the next storage segment is available (block 716). If the subsequent next storage segment is available (e.g., a YES), the source computing node 104 may relocate or write (e.g., via a RDMA operation) a second data object in the next storage segment to the subsequent next storage location (block 718) and write (e.g., via a RDMA operation) the first data object to the storage bucket that is freed up by relocating the second data object (block 714).

If the subsequent next storage segment is unavailable (e.g., a NO), method 700 can return to block 716 for each subsequent next storage segment until a storage segment that is available or can become available via relocating data object(s) and/or portions thereof to its next storage segment and data object(s) and/or portions thereof in any intervening unavailable storage segments can be written to their respective next storage segments in a chained back manner until the first data object is written to the next storage segment with respect to the target storage segment (return 720). That is, one or more storage buckets in the next storage segment with respective to the target storage segment may be freed up so that the data object may ultimately be stored in the next storage segment with respect to the target storage segment.

Figure 8A:
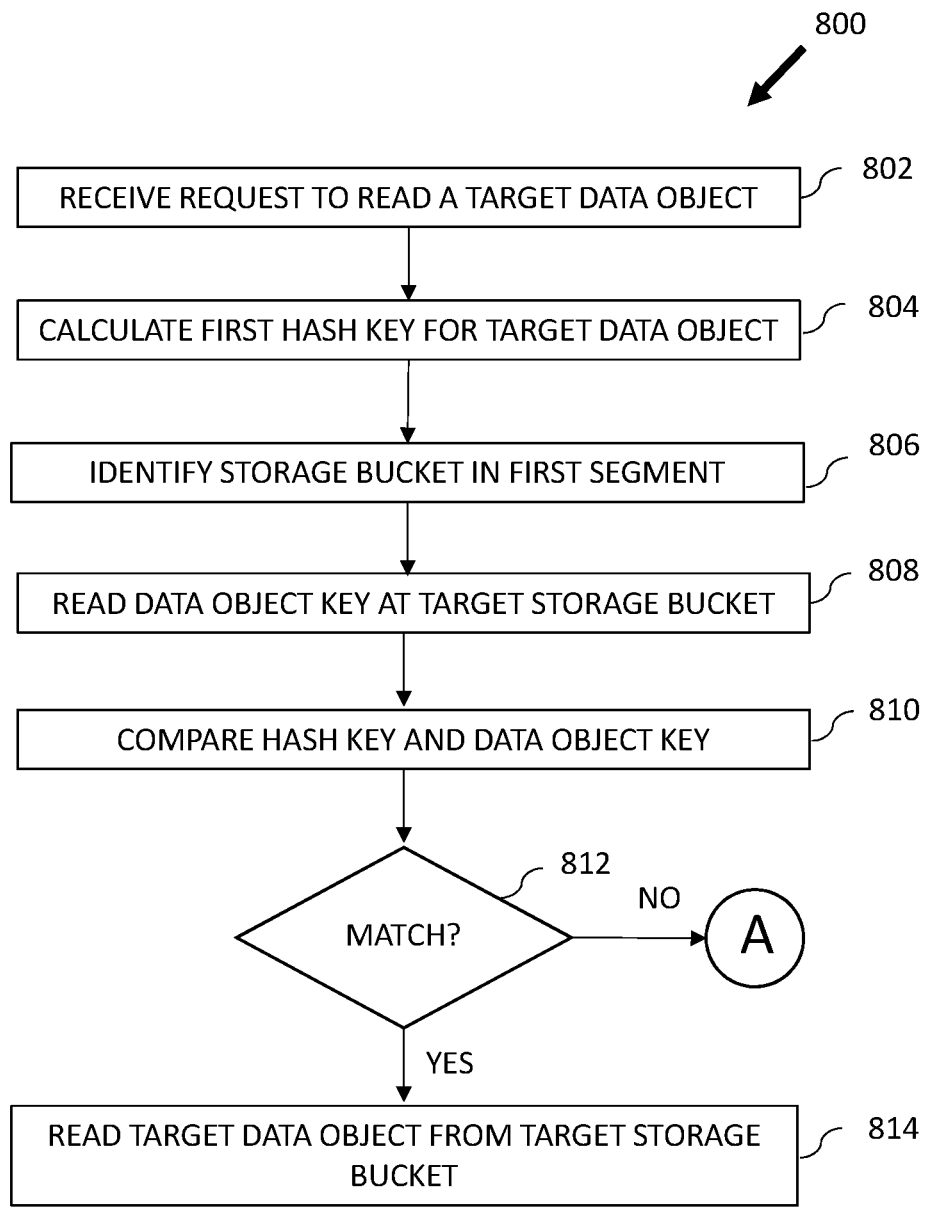
FIGS. 8A-8C are diagrams of an example method of reading data objects from a storage system.
Figure 8B:
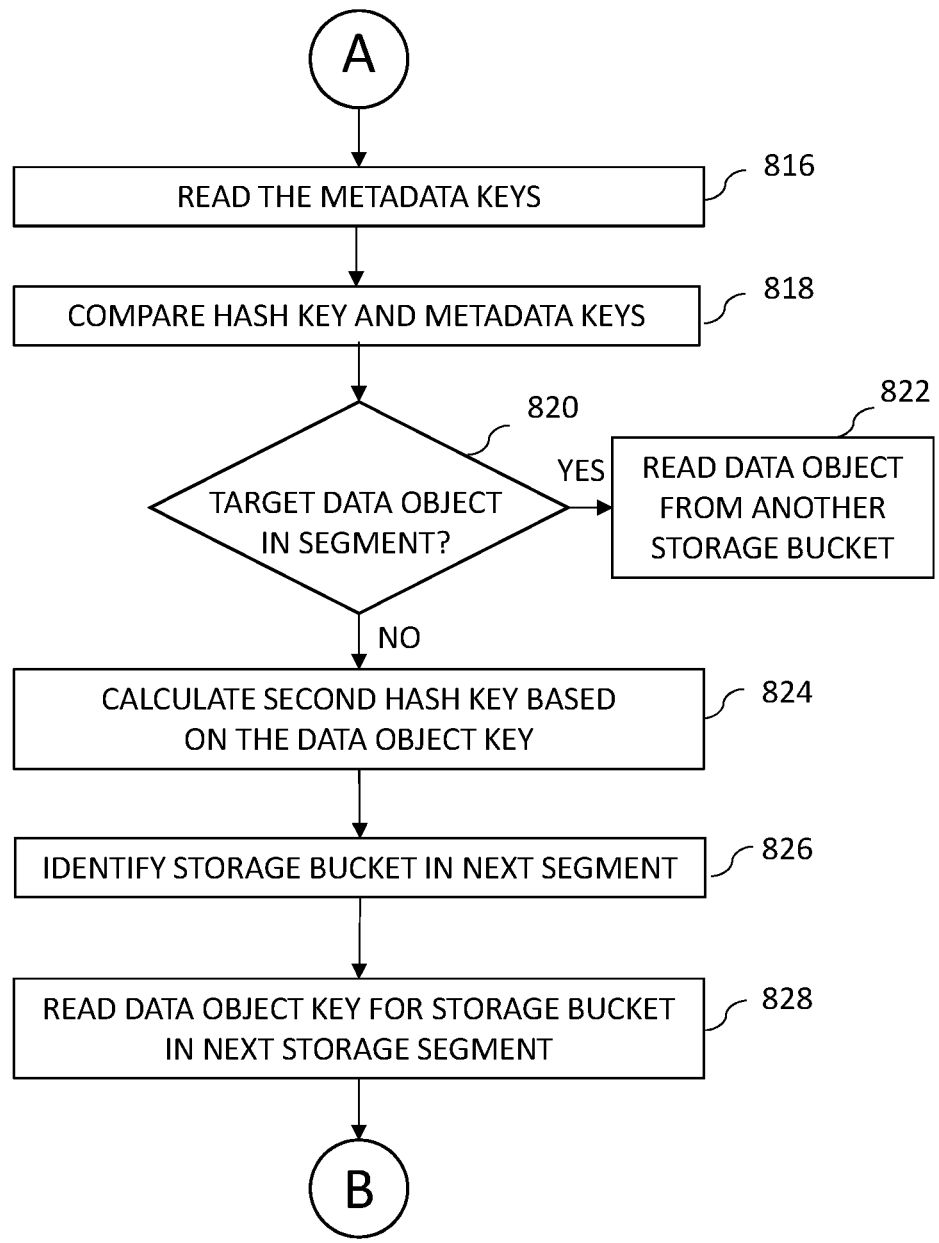
Figure 8C:
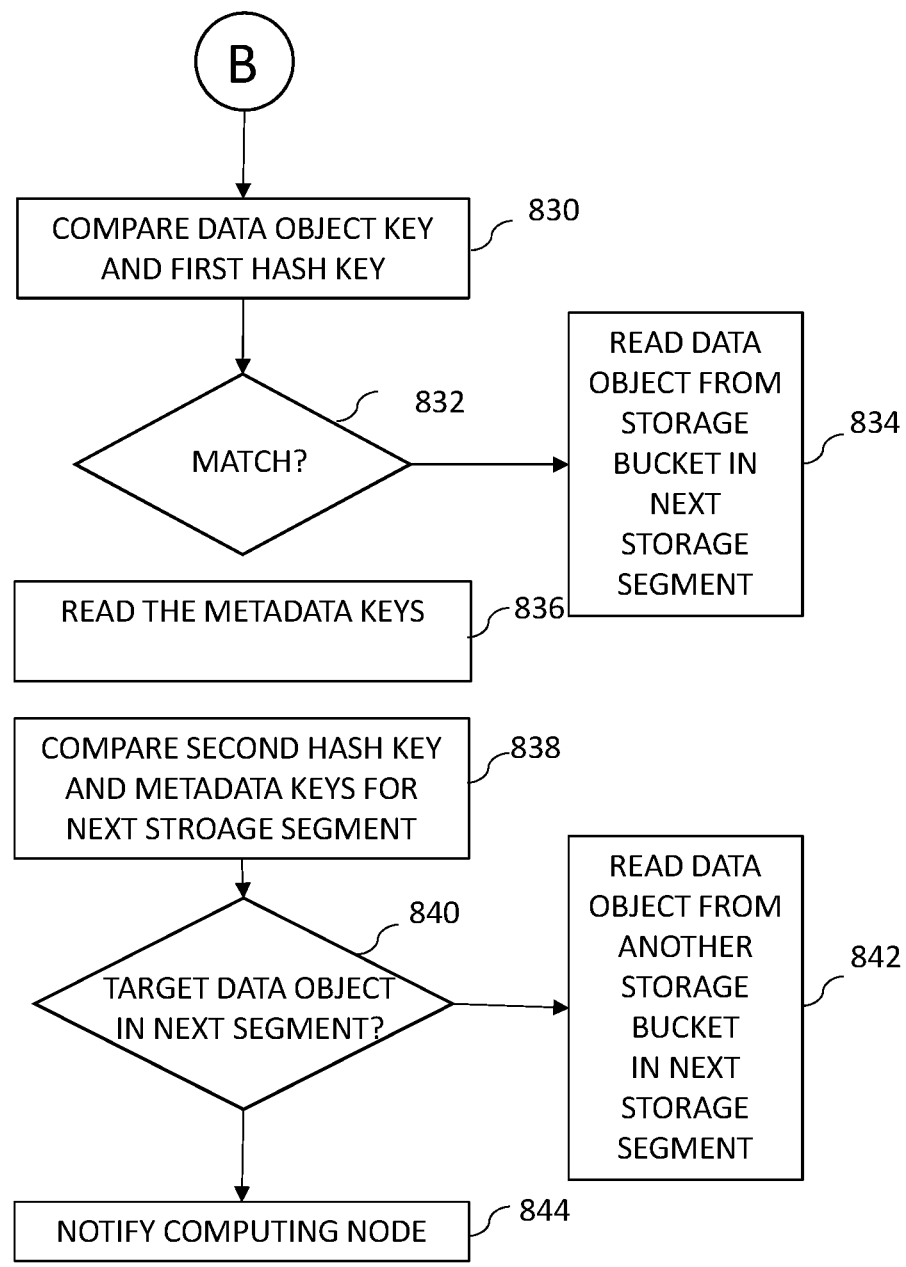

Referring now to FIG. 8, an example method 800 of reading a data object from a storage device is illustrated. As shown, method 800 can begin by a source computing node 104 issuing a RDMA operation to read a target data object from a storage device 208 (block 802). The host computing node 104 may calculate (e.g., via a RDMA operation) a first hash key on the target object (block 804) and identify (e.g., via a RDMA operation) a target storage bucket in a target storage segment based on the first hash key and a map provided by a hash table 206 (block 806).

The source computing node 104 may read (e.g., via a RDMA operation) a data object key for the data object stored in the target storage bucket (block 808). A RDAM operation issued from the source computing node can compare the data object key and the first hash key (block 810) to determine (e.g., via a RDMA operation) if they match (block 812). If there is a match (e.g., a YES), the source computing node 104 can read (e.g., via a RDMA operation) the target data object from the target storage bucket (block 814).

If there is not a match (e.g., a NO), the source computing node 104 can read (e.g., via a RDMA operation) metadata keys corresponding to the data object keys for data objects stored in the storage buckets of the target storage segment (block 816) and compare (e.g., via a RDMA operation) the metadata keys to the first hash key (block 818) to determine if there is a match (block 820). In some embodiments, the metadata keys comprise a user-configured number of bytes (e.g., two bytes, etc.) of data and the data object keys include a user-configured number of bytes (e.g., thirty-two bytes, etc.) of data, among other examples that are discussed elsewhere herein. If there is a match (e.g., a YES), the source computing node 104 can read (e.g., via a RDMA operation) the data object from another storage bucket in the target storage segment (block 822).

If there is not a match (e.g., a NO), the source computing node 104 (e.g., via a RDMA operation) may calculate a second hash key for the data object based on a data object key that was used to identify the target storage bucket (block 824). The source computing node 104 can use the second hash key to identify (e.g., via a RDMA operation) a second target storage bucket that is located in the next storage segment that is one hop away from the target storage segment (block 826).

The data object key for the second storage bucket in the next storage segment may be read (e.g., via a RDMA operation) by the source computing node 104 (block 828) and compared (e.g., via a RDMA operation) to the first hash key (block 830) to determine if there is a match (block 832). If there is a match (e.g., a YES), the source computing node 104 can read (e.g., via a RDMA operation) the data object from the second target storage bucket located in the next storage segment (block 834).

If there is not a match (e.g., a NO), the source computing node 104 may read (e.g., via a RDMA operation) the metadata keys corresponding to the data object keys for data objects stored in the storage buckets of the next storage segment (block 836) and compare (e.g., via a RDMA operation) the metadata keys to the first hash key (block 838) to determine if the data object is stored in the next data object (block 840). If there is a match (e.g., a YES), the source computing node 104 can read (e.g., via a RDMA operation) the data object from another storage bucket in the next storage segment (block 842). If there is not a match (e.g., a NO), the source computing node 104 may determine that the data object is not stored in the storage device 208 and/or the computing node (e.g., computing node 104*n*).

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, RAM, ROM, an EPROM, an EEPROM, a Flash memory, an optical fiber, a CD-ROM, an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A storage network, comprising:
a first node coupleable to a second node, wherein:
the second node includes a set of non-volatile memory devices comprising a set of storage segments divided into a plurality of storage buckets to store data objects;
the first node includes a controller executable to perform operations associated with a remote direct memory access (RDMA) operation on the second node; and the controller is configured to:
execute a first set of operations in association with a single RDMA operation, the first set of operations comprising:
applying a first hash function on a first target data object to calculate a first hash key for the first target data object;
identifying a first target storage bucket for the first target data object in the second node based on the first hash key and a first map of a hash table;
reading a first data object key for a first data object stored in the first target storage bucket;
comparing the first data object key and the first hash key to determine a match;
responsive to the first data object key and the first hash key matching, determining that the first data object is the first target data object;
responsive to the determination that the first data object is the first target data object, reading the first target data object from the first target storage bucket; and
responsive to the first data object key and the first hash key not matching, determining the first data object and the target data object are different data objects; and
responsive to a determination that the first data object and the target data object are different data objects, execute operations including:
reading first metadata for a first set of storage buckets including the first target storage bucket; and
comparing the first hash key to the first metadata to identify a first alternate storage bucket in the first set of storage buckets storing the target data object.

2. The storage network of claim 1, wherein the controller is further configured to execute a second set of operations, the second set of operations comprising:
applying a second hash function on a second target data object to calculate a second hash key for the second target data object;
identifying a second target storage bucket for the second target data object in the second node based on the second hash key and the first map;
reading a second data object key for a second data object stored in the second target storage bucket;
comparing the second data object key and the second hash key to determine a match;
responsive to the second data object key and the second hash key not matching, determining that the second data object and the second target data object are different data objects; and
responsive to a determination that the second data object and the second target data object are different data objects, reading the first metadata to identify the first alternate storage bucket in the first set of storage buckets storing the second target data object, wherein:
a first storage segment comprises the first metadata and the first set of storage buckets; and
the first set of storage buckets comprises the second target storage bucket.

3. The storage network of claim 2, wherein:
the first metadata provides a second map of a first set of metadata keys based on first data object keys for first data objects stored in the first set of storage buckets; and reading the first metadata further comprises:
reading the first set of metadata keys;
comparing the first set of metadata keys and the second hash key to determine a match;
responsive to a first metadata key that corresponds to a third data object key for a third data object stored in the first alternate storage bucket matching the second hash key, determining that the second target data object is stored in the first alternate storage bucket; and
responsive to a determination that the second target data object is stored in the first alternate storage bucket, reading the second target data object from the first alternate storage bucket.

4. The storage network of claim 3, wherein:
the first storage segment comprises a first user-configured number of buckets;
the second target storage bucket comprises a second user-configured number of bytes;
a second data object key comprises a third user-configured number of bytes; and
the second map comprises a fourth user-configured number of bytes.

5. The storage network of claim 3, wherein the controller performs the first set of operations and the second set of operations in association with three RDMA operations.

6. The storage network of claim 3, wherein the second set of operations further comprise:
responsive to the second hash key not matching any of the first set of metadata keys:
applying a third hash function on the second data object key to calculate a third hash key for the second target data object; and
identifying a third target storage bucket in a second storage segment based on the third hash key.

7. The storage network of claim 6, wherein the second set of operations further comprise:
reading a fourth data object key for a fourth data object stored in the third target storage bucket;
comparing the fourth data object key and the second hash key to determine a match;
responsive to the fourth data object key and the second hash key matching, determining that the fourth data object is the second target data object; and
responsive to a determination that the fourth data object is the second target data object, reading the second target data object from the third target storage bucket.

8. The storage network of claim 7, wherein the second set of operations further comprise:
responsive to the fourth data object key and the second hash key not matching, determining that the fourth data object and the second target data object are different data objects; and
responsive to determining that the fourth data object and the second target data object are different data objects:
reading a second set of metadata keys in second metadata;
comparing the second set of metadata keys and the second hash key to determine a match;
responsive to a second metadata key that corresponds to a fifth data object key for a fifth data object stored in a second alternate storage bucket matching the second hash key, determining that the second target data object is stored in the second alternate storage bucket; and
responsive to a determination that the second target data object is stored in the second alternate storage bucket, reading the second target data object from the second alternate storage bucket, the second storage segment being one hop away from the first storage segment, the second storage segment comprising the second alternate target storage bucket, and the second metadata providing a third map of the second set of metadata keys based on second data object keys for second data objects stored in the second storage segment.

9. The storage network of claim 8, wherein the controller performs the first set of operations and the second set of operations in association with five RDMA operations.

10. The storage network of claim 9, wherein the second set of operations further comprise:
responsive to the second hash key not matching any of the second set of metadata keys, determining that the second target data object is not stored in the second node.

11. A method, comprising:
performing a set of operations in association with a first remote direct memory access (RDMA) operation by a first node coupled to a second node, wherein:
the set of operations are performed in association with a single RDMA operation; and
the set of operations comprise:
applying a first hash function on a target data object to calculate a first hash key for the target data object;
identifying a first target storage bucket for the target data object in the second node based on a second hash key and a first map of a hash table;
reading a first data object key for a first data object stored in the first target storage bucket;
comparing the first data object key and the first hash key to determine a match;
responsive to the first data object key and the first hash key not matching, determining that the first data object and the target data object are different data objects; and
responsive to a determination that the first data object and the target data object are different data objects:
reading first metadata for a first set of storage buckets including the first target storage bucket and
comparing the first hash key to the first metadata to identify a first alternate storage bucket in a first set of storage buckets storing the target data object, wherein:
a first storage segment comprises the first set of storage buckets; and
the first set of storage buckets comprises the first target storage bucket.

12. The method of claim 11, wherein:
the first metadata provides a second map of a first set of metadata keys based on first data object keys for first data objects stored in the first set of storage buckets; and
reading the first metadata comprises:
reading the first set of metadata keys;
comparing the first set of metadata keys and the first hash key to determine a match;
responsive to a first metadata key that corresponds to a second data object key for a second data object stored in the first alternate storage bucket matching the first hash key, determining that the target data object is stored in the first alternate storage bucket; and responsive to a determination that the target data object is stored in the first alternate storage bucket, reading the target data object from the first alternate storage bucket.

13. The method of claim 12, wherein the set of operations further comprises:
responsive to the first hash key not matching any of the first set of metadata keys:
applying, in association with a second RDMA operation, a second hash function on the first data object key to calculate a second hash key for the target data object;
identifying, in association with the second RDMA operation, a second target storage bucket in a second storage segment based the second hash key;
reading, in association with the second RDMA operation, a third data object key for a third data object stored in the second target storage bucket;
comparing, in association with the second RDMA operation, the third data object key and the first hash key to determine a match;
responsive to the third data object key and the first hash key matching, determining, in association with the second RDMA operation, that the third data object is the target data object; and
responsive to a determination that the third data object is the target data object, issuing a third RDMA operation to read the target data object from the second target storage bucket.

14. The method of claim 13, wherein the set of operations further comprises:
issuing the second RDMA operation to determine that the third data object and the target data object are different data objects responsive to the third data object key and the first hash key not matching; and
responsive to determining that the third data object and the target data object are different data objects, issuing the third RDMA operation to:
read a second set of metadata keys in second metadata;
compare the second set of metadata keys and the first hash key to determine a match;
responsive to a second metadata key that corresponds to a fourth data object key for a fourth data object stored in a second alternate storage bucket matching the first hash key, determine that the target data object is stored in the second alternate storage bucket;
responsive to a determination that the target data object is stored in the second alternate storage bucket, read the target data object from the second alternate storage bucket; and
responsive to the first hash key not matching any of the second set of metadata keys, determine that the target data object is not stored in the second node, the second storage segment being one hop away from the first storage segment, the second storage segment comprising a second alternate target storage bucket, and the second metadata providing a third map of the second set of metadata keys based on second data object keys for second data objects stored in the second storage segment.

15. A system, comprising:
a first computing node coupled to a second computing node, wherein the first computing node includes a controller;
means, executed by the controller, for performing a hash function on a first data object to determine a first storage bucket in a first target storage segment on the second computing node where the first data object is storable, wherein the hash function is performed using a remote direct memory access (RDMA) operation by the first computing node on the second computing node;

means, executed by the controller, for determining that the first storage bucket is unavailable; and means, executed by the controller, for determining whether the first target storage segment is available or unavailable and, in response to determining that the first target storage segment is unavailable:

determining whether a second target storage segment that is one hop away from the first target storage segment is available or unavailable;

writing, using the RDMA operation, the first data object to another storage bucket in the second target storage segment in response to the determination that the second target storage segment is available; and updating, using the RDMA operation, a first map in first metadata of the second target storage segment to indicate that the first data object is stored in the other storage bucket.

16. The system of claim 15, further comprising:

means, executed by the controller, for, in response to determining that the first target storage segment is available:

writing, using the RDMA operation, the first data object to a second storage bucket in the first target storage segment; and updating, using the RDMA operation, the first metadata in the first target storage segment such that the first map indicates that the first data object is stored in the second storage bucket.

17. The system of claim 15, further comprising:

means, executed by the controller, for:

determining that the second target storage segment is unavailable;

determining a third target storage segment that is one hop away from the second target storage segment;

relocating, using the RDMA operation, a second data object in a second storage bucket in the second target storage segment to a third storage bucket in the third target storage segment to free up the second storage bucket; and updating, using the RDMA operation, a second map in second metadata of the third target storage segment to indicate that the second data object is stored in the third storage bucket.

18. The system of claim 17, wherein:

writing the first data object to the other storage bucket further comprises writing the first data object to the second storage bucket in the second target storage segment; and updating the first metadata further comprises updating the first metadata in the second target storage segment such that the first map indicates that the first data object is stored in the second storage bucket.

19. The storage network of claim 1, wherein:

a first storage segment comprises the first metadata and the first set of storage buckets; and the first set of storage buckets comprises the first alternate storage bucket.

20. The system of claim 15, wherein writing the first data object and updating the first map are performed in association with a single RDMA operation.

\* \* \* \* \*